United States Patent
Eijsackers et al.

(10) Patent No.: US 7,790,211 B2
(45) Date of Patent: Sep. 7, 2010

(54) PACKAGE WITH PARTLY FOAMABLE LIQUID BY MEANS OF WHICH A REFRESHMENT CAN BE PREPARED

(75) Inventors: Armin Sjoerd Eijsackers, Utrecht (NL); Age Willem Tanja, Groningen (NL)

(73) Assignee: Sara Lee/DE N.V., Utrecht (NL)

( * ) Notice: Subject to any disclaimer, the term of this patent is extended or adjusted under 35 U.S.C. 154(b) by 1016 days.

(21) Appl. No.: 10/565,946

(22) PCT Filed: Jul. 22, 2004

(86) PCT No.: PCT/NL2004/000525

§ 371 (c)(1),
(2), (4) Date: Jul. 19, 2006

(87) PCT Pub. No.: WO2005/009865

PCT Pub. Date: Feb. 3, 2005

(65) Prior Publication Data

US 2007/0031545 A1   Feb. 8, 2007

(30) Foreign Application Priority Data

Jul. 28, 2003   (NL) .................................... 1024012

(51) Int. Cl.
*B65D 81/32* (2006.01)
(52) U.S. Cl. ...................... 426/112; 426/115; 206/219; 206/221; 220/501

(58) Field of Classification Search ............... 99/287, 99/295, 297; 206/219, 221; 220/501, 553, 220/666; 426/112, 115, 131, 120, 119, 106; 261/123; 215/6, 900; 222/92, 129, 251, 222/429

See application file for complete search history.

(56) References Cited

U.S. PATENT DOCUMENTS

| 1,982,884 | A | | 12/1934 | Schroder et al. |
| 4,306,492 | A | * | 12/1981 | Zimmermann ............... 99/287 |
| 5,939,122 | A | | 8/1999 | Brady |
| 2002/0078831 | A1 | | 6/2002 | Cai |

FOREIGN PATENT DOCUMENTS

| DE | 3838530 A1 | 5/1990 |
| DE | 4332387 A1 | 3/1995 |
| EP | 1462042 | 9/2004 |
| GB | 2373710 | 10/2002 |
| JP | 55-92130 | 7/1980 |
| JP | 62-298433 | 12/1987 |
| NL | 1029155 | 4/2006 |
| WO | WO 2005/063093 | 7/2005 |
| WO | WO 2008/147195 | 12/2008 |

* cited by examiner

*Primary Examiner*—Drew E Becker
*Assistant Examiner*—Preston Smith
(74) *Attorney, Agent, or Firm*—Foley & Lardner LLP

(57) ABSTRACT

A package including a gas and an at least partly foamable liquid (2) by means of which a refreshment can be prepared, wherein the package is provided with manually operable means (7) with which a displacement of the gas and the liquid in the package can be effected such that foam formation occurs in the package.

31 Claims, 3 Drawing Sheets

Figure 2:
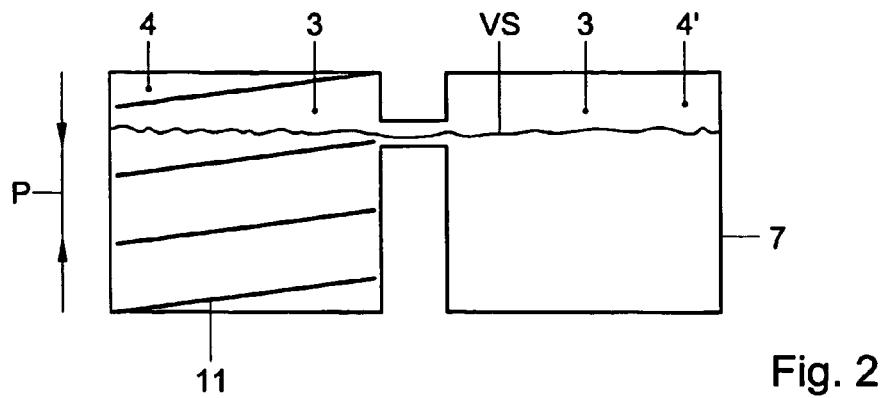

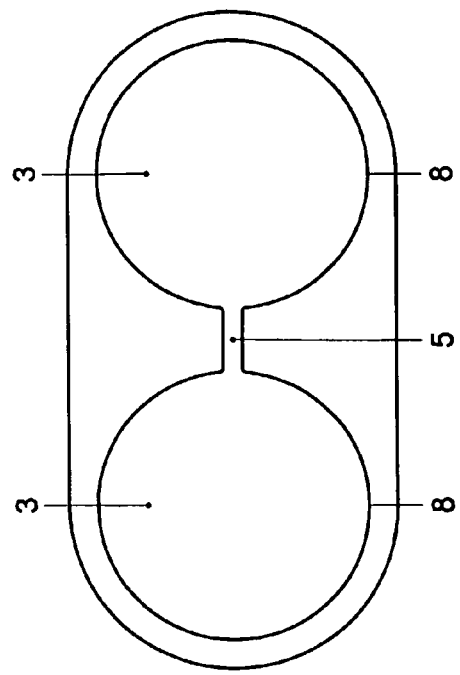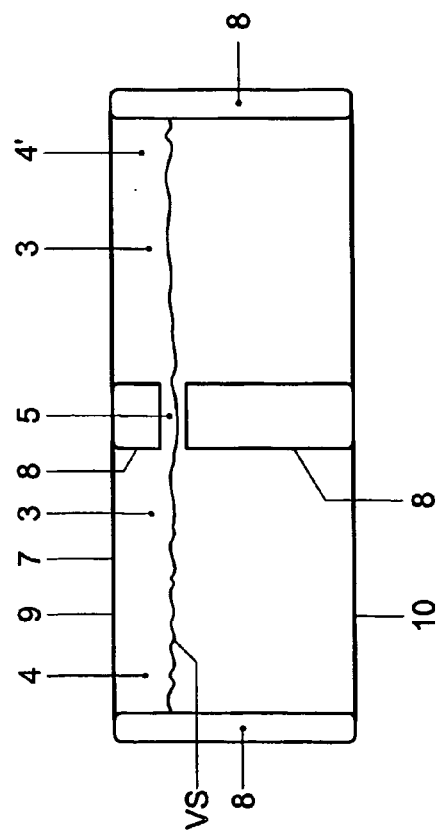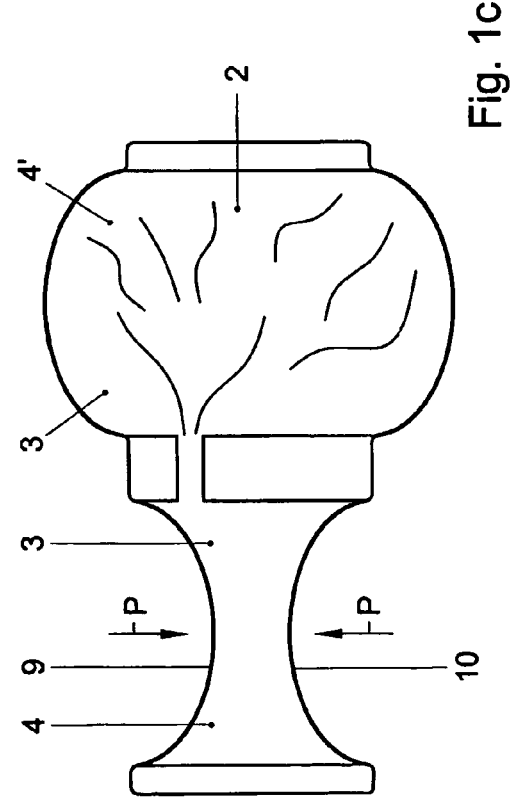
Fig. 1a
Fig. 1b
Fig. 1c

PACKAGE WITH PARTLY FOAMABLE LIQUID BY MEANS OF WHICH A REFRESHMENT CAN BE PREPARED

The invention relates to a package including a gas and an at least partly foamable liquid by means of which a refreshment can be prepared.

The invention also relates to a method for obtaining foam in a package including a gas and an at least partly foamable liquid, by means of which foam a refreshment can be prepared while the method comprises displacing the liquid and the gas in the package.

In addition, the invention relates to a method for preparing coffee suitable for immediate consumption, which is provided with a foam layer.

Such a device is known from DE 43 32 387. Herein, an airtight holder is described in which a liquid extract is included. A part of the volume of the holder is occupied by air. Before opening of the package takes place, the holder can be shaken, the air and the liquid mixing such that foam is formed in the holder. During mixing, the gas is, as it were, taken up by the liquid leading to the formation of air bubbles. When air bubble formation occurs frequently, foam is formed. When the holder is opened, the foam can be drunk or be introduced into a cup or the like.

A drawback of such a package is that shaking requires rather conspicuous operations. For some people, these operations are unpleasant to perform. To effect sufficient foam formation, the package is sometimes to be shaken quite vigorously. This also requires space, which is not always available to the user of the known package.

An object of the invention is to meet at least one of the above-mentioned drawbacks.

This object is achieved with a package according to the invention which is characterized in that the package is provided with manually operable means with which a displacement of the gas and the liquid in the package can be effected such, that foam formation occurs in the package. Due to the presence of manually operable means for displacing the liquid and the gas, it is no longer necessary to shake the package vigorously to and fro. Also, when in use, no additional space is required for carrying out the shaking movement.

In this document, the liquid and/or the gas is also sometimes expressed in a general term, i.e. a fluid.

A special embodiment of a package according to the invention is H characterized in that the means are designed for manually varying, at least as to shape, the package space for the liquid and the gas. Thus, in a very simple manner, the gas and the liquid are displaced in the package. Further, with respect to a shaking movement, the package can be held, at least virtually, stationary in one position, which entails a less conspicuous preparation of foam.

Preferably it holds, that the means comprise a material, designed so as to be flexible from which at least a part of the package has been manufactured. The flexible material can be squeezed together, be dented or folded so that at least a part of the liquid and the gas, in fact the part that was present in a volume part of the package that is squeezed together, dented or folded, moves within the package so that foam formation can occur in the package.

In particular it holds, that the means also comprise at least two mutually connected chambers between which the liquid and/or the gas are displaceable. In that case, the liquid and/or the gas can move from one chamber to the other chamber and, optionally, vice versa. This can take place, for instance, by first decreasing the volume of the one chamber so that the liquid and the gas flow to the other chamber. Then, the volume of this other chamber can be decreased, so that the liquid and the gas flow back again to the one chamber. This cycle can be repeated many times so that a much foam formation can occur and the liquid and the gas can turn to foam, if possible completely.

In particular, it holds that the means comprise a fluid flow disturber. By disturbing the fluid flow, gas and liquid are mixed better so that foam formation occurs easier. This fluid flow disturber can comprise at least one channel, constriction or grid located between the at least two chambers.

The fluid flow disturber can also comprise turbulence means for causing turbulence in a fluid flow. As a result, per volume unit, a highly efficient mixing of gas and liquid takes place which is beneficial to the formation of foam. The turbulence means can comprise small obstacles, breaking up the fluid flow at that location. The turbulence means can for instance also comprise a widening of a channel through which the fluid flows.

Preferably it holds, that at least a part of the package is designed so as to be transparent. This offers the advantage that a user can observe to what extent foam formation has been effected.

Figure 3:
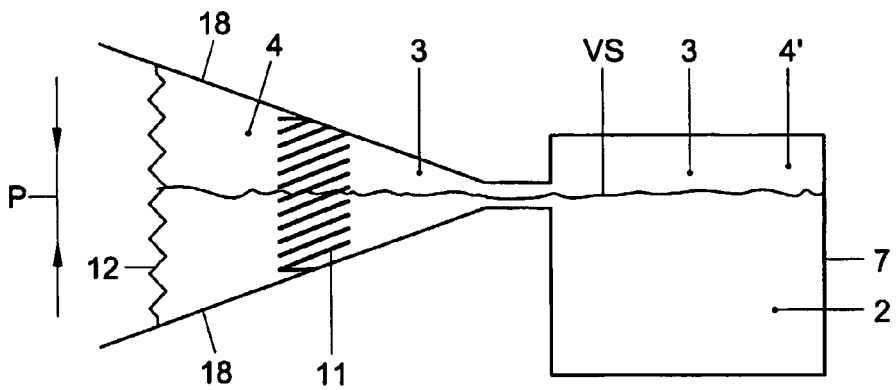
Figure 4:
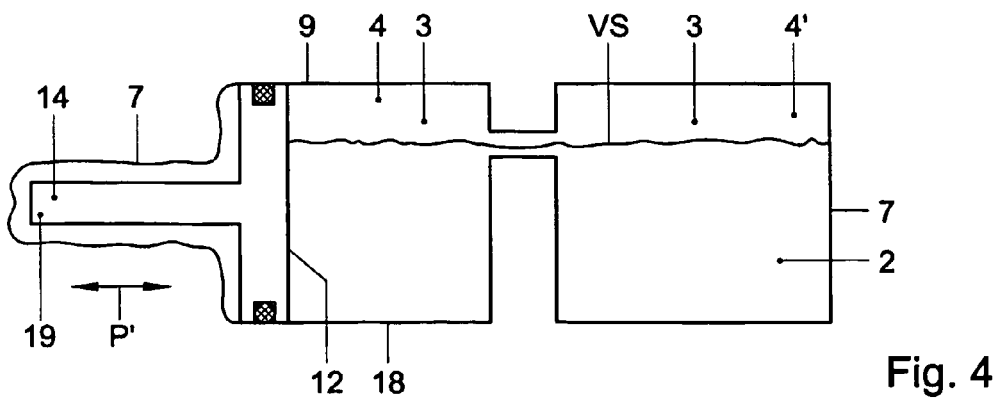
Figure 5:
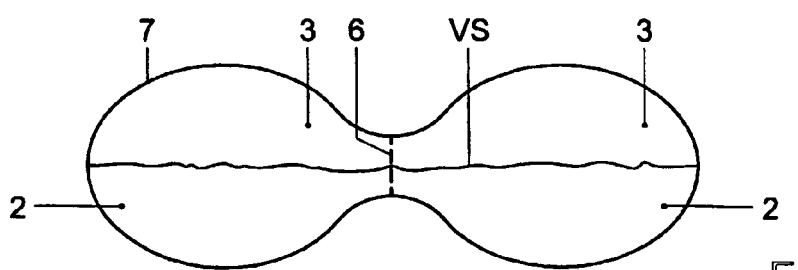
Figure 6A:
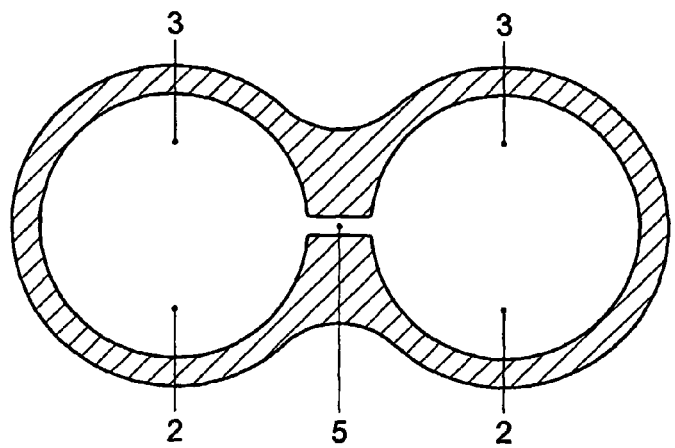
Figure 6B:
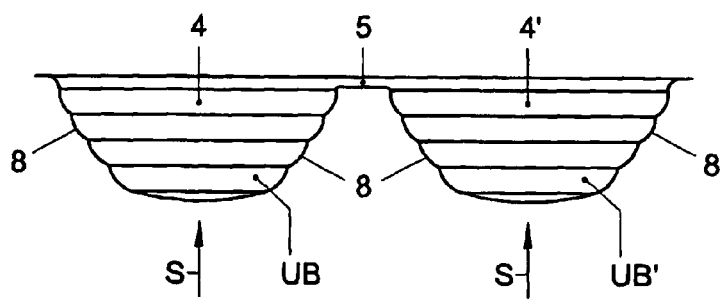
Figure 7A:
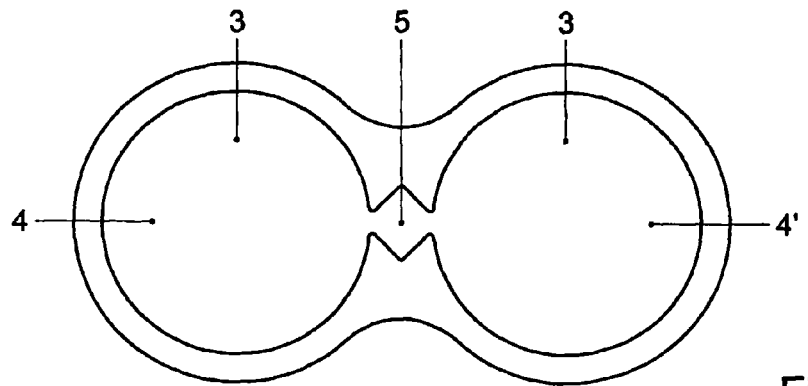
Figure 7B:
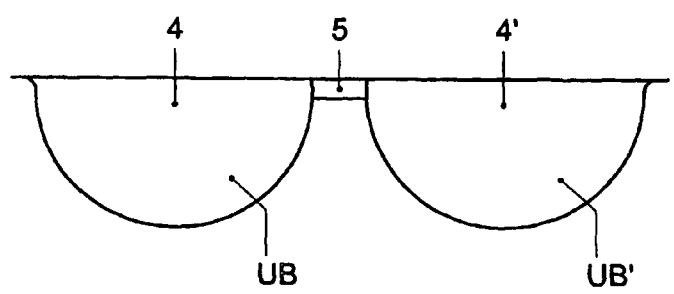

The invention is presently elucidated with reference to a drawing. In the drawing:

FIG. 1*a* schematically shows a side view of a first embodiment of a package according to the invention;

FIG. 1*b* shows a top plan view of the embodiment shown in FIG. 1*a*;

FIG. 1*c* shows a side view of the embodiment shown in FIG. 1*a*, while a pressure is exerted on a part of the package;

FIG. 2 schematically shows a side view of a second embodiment of a package according to the invention;

FIG. 3 schematically shows a side view of a third embodiment of a package according to the invention;

FIG. 4 schematically shows a side view of a fourth embodiment of a package according to the invention;

FIG. 5 schematically shows a side view of a fifth embodiment of a package according to the invention;

FIG. 6*a* schematically shows a top plan view of a sixth embodiment of a package according to the invention;

FIG. 6*b* schematically shows a side view of the embodiment shown in FIG. 6*a*;

FIG. 7*a* schematically shows a top plan view of a seventh embodiment of a package according to the invention; and FIG. 7*b* schematically shows a side view of the embodiment shown in FIG. 7*a*.

Identical parts are provided in the drawing with identical reference signs.

Each embodiment of a package 1 according to the invention comprises a package including a gas (not shown) and an at least partly foamable liquid 2. With this liquid, a refreshment can be prepared. The package is provided with manually operable means with which a displacement of the gas and the liquid 2 in the package 1 can be effected such that foam formation occurs in the package 1. It will be clear to the skilled person that the embodiments of the package according to the invention described here each comprise a closed package. In particular, the means are designed for manually varying, at least as to shape, a package space 3 for the liquid 2 and the gas. It is possible that the means comprise a material 7 designed so as to be flexible from which at least a part of the package 1 has been manufactured.

For the embodiment of FIG. 1*a* it holds, that the means comprise at least two mutually connected chambers 4, 4', between which the liquid 2 and the gas are displaceable. The means also comprise a fluid flow disturber. The fluid flow disturber can for instance comprise a channel 5 (see FIGS.

1a-1c) or a constriction or grid 6 (see FIG. 5) located between the at least two chambers 4, 4'. In the embodiment shown in FIG. 1, the chambers 4, 4' comprise raised walls 8 comprising relatively rigid parts. An upper wall 9 and a lower wall 10 have been manufactured from flexible, and in this example even elastic, materials and can be squeezed together. According to this example, the raised walls 8 will hardly, if at all, bend along with the flexible upper wall 9 and lower wall 10. When squeezing the upper wall 9 and lower wall 10 together as indicated with the arrows P in FIG. 1c, the volume of the chamber 4 is decreased. The volume of chamber 4' will increase as shown in FIG. 1c. Both the liquid 2 and the gas will now flow from the chamber 4 via channel 5 to the chamber 4'. In an embodiment in which the flexible material is designed to be also elastic, when the squeezing forces are removed, the volume of chamber 4 will increase again and an optionally occurring sucking effect can cause the liquid and the gas to flow back again from chamber 4' to chamber 4. Upon an increase of the volume of chamber 4, the volume of the chamber 4' will decrease again. It is also possible to alternately squeeze together chamber 4 and chamber 4', so that the fluid moves to-and-fro between these chamber and foam formation occurs as a result of the liquid and the gas mixing. Due to the diameter of the constriction of channel 5 with respect to the size of the chambers 4 and 4', the fluid, comprising both the liquid and the gas, cannot flow freely from chamber 4 to chamber 4' and back. The fluid is urged to flow via channel 5. The constriction the fluid flow encounters when flowing from chamber 4 in the direction of chamber 4' and vice versa, and the widening the fluid flow experiences when the fluid flow flows from channel 5 into either chamber 4' or chamber 4, cause a disturbance of the fluid flow. As a result, the gas and the liquid are mixed with each other and foam formation occurs.

In FIG. 2, in chamber 4, a spring 11 is included. In the example as shown in FIG. 2, the raised wails 8 of chamber 4 are manufactured from a flexible material. The upper wall 9 and lower wall 10 can be manufactured from a relatively rigid material. It is possible that with this variant, only the chamber with the spring 11 needs to be alternately pressed and relaxed for obtaining a fluid flow which moves via channel 5 between the chambers 4, 4'.

In FIG. 3, an embodiment is shown in which the means designed for manually varying, at least as to shape, a package space for the liquid and the gas, comprise a bellows. The bellows can also comprise a spring 11. In this case, preferably, the walls 18 of the chamber 4 are designed to be relatively rigid. Preferably, the wall 12 of the bellows is manufactured from a flexible material 7.

The means as shown in FIGS. 2 and 3 can be operated as follows. The volume of the chamber 4 can be reduced against the spring force. As a result thereof, the liquid and gas present in chamber 4 will be urged to flow via channel 5 to chamber 4'. Upon elimination of the applied force, i.e. when the spring 11 is relaxed, the volume of chamber 4 will increase again. It is possible that then, a sucking effect occurs such that at least a part of the liquid and gas present in chamber 4' flows back again into the chamber 4 of a package 1. As explained in the description of FIG. 1, as a result of the flow through channel 5, foam formation can occur because channel 5 acts as a fluid flow disturber promoting to a large extent the mixing of the liquid and gas.

As shown in FIG. 4, the means designed for manually varying, at least as to shape, a package space for the liquid and the gar, can comprise a piston 12 which is included in a package and which can be operated from an outside of a package 1. The piston 12 links up to the relatively rigid upper wall 9 and lower wall 10 of a package as drawn in FIG. 4. Optionally, in chamber 4, between the piston 12 and the channel 5, also a spring 11 can be included.

The means of the embodiment as shown in FIG. 4 can be operated as follows. The piston 12 is moveable in the direction of the chamber 4'. The piston can be operated by applying a force in the direction of the chamber 4' to a projecting part 14 of the package 1 in which a driving part 19 of the piston is included. A part of the package 1 located, in the position shown in FIG. 4, on a side of the piston remote from the liquid 2, comprises a flexible material 7 so that it can move along with the driving part 19. The driving part 19 is connected, preferably on an inside of the package, to a part of the flexible material 7. Further, the driving part can be provided with a pulling member (not shown) which, optionally, reaches beyond the package and which serves for returning the piston 12. A spring (not shown) can cause the piston, when released after being pressed in, to move such that the content of the chamber 4 is increased again.

FIG. 5 also comprises a package with two chambers 4, 4'. In this case, the fluid flow disturber comprises a grid 6 included in the package at a position where chamber 4 is connected to chamber 4'. However, it could also be stated that chamber 4 and chamber 4' can be considered to be one whole and that approximately in the middle of this whole a gauze, or grid, is included for disturbing a fluid flow which can occur when a package space 3 is manually varied, at least as to shape. This is possible as in this example, the package is manufactured, at least partly, from a flexible material. When the fluid flows through the gauze or the grid 6, foam formation will also occur as the gas and the liquid will mix due to the liquid being disturbed.

In FIG. 6a, a top plan view of a preferred embodiment of a package according to the invention is shown. In this case, each of the chambers 4, 4' of the package 1 comprises a downwardly directed bulge UB, UB'. In this case, each bulge UB, UB' is manufactured from a flexible material. Therefore, it is possible to press the bulge in, in upward direction, such as for instance in the direction of the arrows S. By alternately pressing in first bulge UB and then bulge UB', the liquid and the gas present in the package will flow from chamber 4 to chamber 4', and from chamber 4' back to chamber 4, respectively. In this case, this fluid flow will also have to take place via channel 5. The above-described effects that occur when the fluid flows through the fluid flow disturber such as channel 5 will, in this case too, lead to foam formation. This package is designed to be symmetrical and can moreover be manufactured in a relatively inexpensive and simple manner. The part of the package shown in FIG. 6b can comprise a plastic top sheet provided with two cup-shaped parts each comprising a bulge UB, UB'. Channel 5 too can be included in the part shown in FIG. 6b. The part of the package shown in FIG. 6a can be provided with an, optionally transparent, plastic top sheet closing off the bulge UB, UB' and the channel 5 on the top side shown in FIG. 6, so that a closed package is involved. The part, hatched in FIG. 6a, can then serve as a contact surface visible due to the transparent top sheet where the two plastic sheets have been attached to each other.

In FIG. 7a, a top plan view of a similar package as the one shown in FIG. 6a is represented. However, in this case, the channel 5 is also provided with turbulence means for causing turbulence in the fluid flow. In this case, the turbulence means comprise a widening of the channel 5 included in the channel 5. It is also possible that the turbulence means comprise obstacles in channel 5.

In the embodiments shown in FIGS. 1a, 2, 3, 4 and 5, a level of liquid VS is indicated. Preferably it holds, that in the positions of the embodiments shown, this level of liquid VS is such that the level of liquid extends through the fluid flow disturber. As a result, when the liquid is displaced, in virtually all cases, an amount of gas is taken along into the fluid flow disturber so that mixing of the gas and the liquid can take place and can lead to foam formation.

For each embodiment it holds that it is possible to therewith carry out a method, also according to the invention. This method is directed to obtaining foam in a package including a gas and an at least partly foamable liquid. The method comprises displacing the liquid and the gas in the package, The method also comprises varying, at least as to shape, a package space of the liquid and the gas. It is possible that the variation as to shape also entails a variation as to volume.

Such a package according to the invention and method can be used in a method, also according to be invention, for preparing coffee directly suitable for consumption which is provided with a foam layer. Such a method also comprises separating the at least partly foamed liquid from the package and adding a drinkable liquid such as, for instance, water and/or milk to the at least partly foamed liquid. With this, it is possible to prepare from an extract a cup of coffee with a foam layer, for which there is a need nowadays.

The invention is not limited in any manner to the exemplary embodiments shown. For instance, it is possible that the means are provided with at least two separate parts, each comprising at least one chamber 4, 4' and being connectable to each other. Then, it can hold that at least one of the at least two chambers is at least partly filled with the gas, and at least another of the at least two chambers is at least partly filled with the liquid. For instance, a chamber with gas can be supplied or sold once, and, each time, be connectable again to a new chamber including a liquid. As stated, the package is preferably designed to be transparent.

The liquid in the package can comprise an extract. Preferably, a coffee extract is involved here, in which, optionally, a coffee milk extract is included. For instance, a cappuccino extract can be involved. If desired, such an extract can be aromatized. However, other extracts are possible too. Here, cocoa extract, fruit juice extract and soup extract can be considered. However, the liquid can also comprise a concentrate or other instant products which can be foamed.

The package can also comprise a provision for opening the package so that the at least partly foamed liquid and the package can be separated from each other. The chambers 4, 4' can be designed such that, upon reduction of the chamber volume, each of them already urges the liquid and the gas in the direction of the fluid flow disturber.

Such variants are all understood to fall within the framework of the invention.

The invention claimed is:

1. A package for preparing a refreshment, the package including a package space containing a gas and an at least a partly foamable liquid wherein the package is provided with at least one manually operable element with which a displacement of the gas and the liquid in the package can be effected such that foam formation occurs in the package space wherein the package space comprises at least two chambers mutually connected by a channel located there between, the liquid and the gas being displaceable between the at least two chambers via the channel, wherein the channel is associated with a fluid flow disturber for causing turbulence in fluid flowing between the at least two chambers, wherein each of the at least two chambers is configured for being varied by the at least one manually operable element at least as to shape, wherein the at least two chambers are each defined by a flexible wall, wherein alternating distortion of the flexible wall at least partially defining each of the at least two chambers, is configured to cause the liquid and gas to flow through the flow disturber to effect foam formation.

2. The package according to claim 1, wherein at least a part of the package space has been formed from a material configured so as to be flexible.

3. The package according to claim 2, wherein the flexible material is also elastic.

4. The package according to claim 1, wherein the at least one manually operable element comprises a bellows.

5. The package according to claim 1, wherein the at least one manually operable element comprises a piston within the package space and which can be operated from outside the package.

6. The package according to claim 1, wherein the package space is provided with at least two separate parts which each comprise at least one of the at least two chambers and which at least two separate parts are connectable to each other.

7. The package according to claim 1, wherein the fluid flow disturber comprises at least one of a constriction, a gauze, or grid.

8. The package according to claim 1, wherein at least one of the at least two chambers is at least partly filled with the gas.

9. The package according to claim 8, wherein at least one of the at least two chambers is at least partly filled with the liquid.

10. The package according to claim 1 wherein at least a part of the package is configured to be transparent.

11. The package according to claim 1 wherein at least a part of the package is made from a plastic sheet.

12. The package according to claim 11, wherein the plastic sheet is provided with at least one cup-shaped part.

13. The package according to claim 12, wherein the cup-shaped part can be pressed in for displacing the gas and the liquid in the package.

14. The package according to claim 13 wherein the liquid comprises one of an extract and a concentrate.

15. The package according to claim 14 wherein the extract or the concentrate comprises a coffee extract.

16. The package according to claim 1 further comprising a provision for opening the package space so that the at least partly foamed liquid and the package can be separated from each other.

17. The package according to claim 1, wherein at least a part of the package is made from a flexible material.

18. The package according to claim 2, wherein the at least one manually operable element comprises a bellows.

19. The package according to claim 3, wherein the at least one manually operable element comprises a bellows.

20. The package according to claim 1, wherein the at least one manually operable element comprises a piston within the package space and which can be operated from outside the package.

21. The package according to claim 2, wherein the at least one manually operable element comprises a piston within the package space and which can be operated from outside the package.

22. The package according to claim 3, wherein the at least one manually operable element comprises a piston within the package space and which can be operated from outside the package.

23. The package according to claim 2, wherein the package space is provided with at least two separate parts which each comprise at least one of the at least two chambers and which at least two separate parts are connectable to each other.

24. The package according to claim 3, wherein the package space is provided with at least two separate parts which each comprise at least one of the at least two chambers and which at least two separate parts are connectable to each other.

25. The package according to claim 4, wherein the package space is provided with at least two separate parts which each comprise at least one of the at least two chambers and which at least two separate parts are connectable to each other.

26. The package according to claim 5, wherein the package space is provided with at least two separate parts which each comprise at least one of the at least two chambers and which at least two separate parts are connectable to each other.

27. The package according to claim 6, wherein at least one of the at least two chambers is at least partly filled with the gas.

28. A package for creating a foam layer in a liquid refreshment, the package comprising:
    a first chamber defined at least partially by a first flexible wall;
    a second chamber in fluid communication with the first chamber and defined at least partially by a second flexible wall;
    a flow disturber located between the first chamber and the second chamber and configured to disturb the liquid refreshment flowing between the first chamber and the second chamber;
    wherein alternating distortion of the first flexible wall and the second flexible wall is configured to cause liquid refreshment to flow through the flow disturber between the first and second chambers to create the foam layer.

29. The package according to claim 28, wherein pressure applied to the first flexible wall alters the volume and shape of the first chamber and pressure applied to the second flexible wall alters the volume and shape of the second chamber.

30. An apparatus to generate foam in a liquid, the apparatus comprising:
    a first chamber configured to contain at least a first portion of the liquid, the first chamber defined by a side wall, an upper wall, and a bottom wall;
    a second chamber coupled to the first chamber and configured to contain at least a second portion of the liquid, the second chamber defined by a side wall, an upper wall, and a bottom wall;
    a channel between the first chamber and the second chamber to allow movement of liquid between the first chamber and the second chamber;
    wherein at least one of the upper wall or the lower wall of the first chamber is made from a flexible material so that squeezing of the first chamber decreases the volume within the first chamber and forces liquid from the first chamber through the channel and into the second chamber;
    wherein at least one of the upper wall or the lower wall of the second chamber is made from a flexible material so that squeezing of the second chamber decreases the volume within the second chamber and forces liquid from the second chamber through the channel and into the first chamber;
    wherein movement of the liquid through the channel during use by alternating squeezing of the first chamber and the second chamber introduces gas in the liquid to generate foam.

31. The apparatus according to claim 30, wherein squeezing of the first chamber changes the volume and space of the first chamber, and squeezing of the second chamber changes the volume and shape of the second chamber.

* * * * *